United States Patent Office 3,211,806
Patented Oct. 12, 1965

3,211,806
PROCESS OF MAKING A BLEND OF POLYVINYL CHLORIDE AND HEXAMETHOXYMETHYL MELAMINE AND HARDENING SAME
John Christos Petropoulos, Norwalk, and Frank Russell Spencer, Stamford, Conn., assignors to American Cyanamid Company, Stamford, Conn., a corporation of Maine
No Drawing. Filed Nov. 21, 1963, Ser. No. 325,471
1 Claim. (Cl. 260—853)

This invention relates to a novel method for the hardening of various articles of manufacture. More particularly, this invention relates to a novel method for hardening polymeric materials and increasing their solvent and heat resistance. Still more particularly, this invention relates to a novel process for hardening and increasing the solvent and heat resistance of resinous materials comprising blending the resinous polymeric material with hexamethoxymethylmelamine and then contacting the resultant blended composition with acidic vapors or fumes.

Industry and the military have long been searching for methods of rigidizing various resinous materials which are used in, for example, the shoe industry, the pipe industry or as sheets or fabrics for military applications such as huts, etc. That is to say, in the manufacture of such articles as shoes, it is often desirable to construct certain parts, such as the heel and toe regions of the upper, of a harder consistency. Additionally, in the production of piping, a major cost has been that of transportation of the finished pipe. The cost is due to the bulkiness, weight and space utilized in the transportation. It is therefore desirable to transport continuous lengths of pipe in a coiled state, much in the same manner as garden hose. The pipe preferably can then be cut to length at the place of installation, installed and then made hard, rigid and heat resistant. Furthermore, in the military, it is desirable to transport resinous sheets or fabrics in a compactly folded form before use and then rigidize them for use as huts or covers, etc. at the place where they are needed.

We have now discovered a method for the rigidizing of resinous compositions in any shape or form, which method fulfills the needs set forth above. We have discovered that various resinous polymers may be hardened, toughened and made solvent and heat resistant at room temperature by blending them with hexamethoxymethyl melamine and then contacting the resultant blended composition with acidic fumes or vapors.

It is therefore an object of the present invention to provide a novel process for the hardening of various articles of manufacture.

It is a further object of the present invention to provide a novel method for hardening and increasing the solvent and heat resistance of polymeric materials.

It is still a further object of the present invention to provide a novel process for hardening resinous polymers comprising blending the polymeric resin with hexamethoxymethylmelamine and then contacting the resultant blended compositions with acidic vapors or fumes.

These and further objects of the present invention will become more apparent to those skilled in the art upon reading the more detailed description set forth hereinbelow.

As mentioned above, we have found that various resinous polymers may be made harder and more solvent and heat resistant by blending them with hexamethoxymethyl melamine and then contacting the resultant blended compositions with acidic vapors or fumes.

Polymethyl ethers of polymethylol melamines, and the processes for preparing them, are well known in the art, see specifically, U.S. Patents Nos. 2,918,452, 2,998,410 and 2,998,411.

The hexamethoxymethyl melamine blended with the resinous polymers is very difficult to prepare in a pure state. In the known processes for preparing this highly etherified, highly methylolated melamine, the analysis of the final product tends to indicate that the average methylolation is less than hexamethylol melamine. Likewise, the average degree of methylation appears to be less than the hexamethyl ether. Nevertheless, these products are deemed to contain a preponderance of the hexamethoxymethyl melamine compound and lesser amounts of such materials as the tetramethyl ether of tetramethylol melamine, the tetramethyl ether of pentamethylol melamine, the tetramethyl ether of hexamethylol melamine, the pentamethyl ether of pentamethylol melamine and the pentamethyl ether of hexamethylol melamine. It is to be understood, therefore, that wherever hexamethoxymethyl melamine is referred to herein, those compositions which contain melamine derivatives that are, on an average, not fully methylolated or fully methylated, but which approach such full methylolation and etherification, are encompassed and are substantially equivalent to pure hexamethyoxymethyl melamine. Hexamethoxymethyl melamine is a monomeric material but is potentially a resin-forming material and can interreact with itself and other monomeric materials, such as those containing a terminal hydroxy group. This feature of hexamethoxymethyl melamine comes into focus especially in the method for the preparation of hard, tough articles from resinous compositions partially composed thereof.

The hexamethoxymethyl melamine may be blended with many resinous materials in the first step of our novel process to form the resinous compositions containing hexamethoxymethyl melamine which are then subjected to the second step of our method. For instance, we may utilize such resinous materials as poly(vinyl chloride), poly(vinylidene chloride), acrylate and methacrylate homopolymers or copolymers thereof with various monoethylenically unsaturated monomers copolymerizable therewith such as styrene, acrylamide, acrylonitrile and the like, various alkyd resins of polybasic acids and polyhydric alcohols, alone or in conjunction with fatty acids and the like. Generally, we may use any thermoplastic resinous material which is miscible with the hexamethoxymethyl melamine constituent.

The resinous polymers are first blended with from about 25% to 150%, by weight, based on the weight of the resinous polymer, of the hexamethoxymethyl melamine. Amounts lower or higher than this may be used, however, we have found that the above specified range is generally sufficient, in that, at percentages lower than 25%, the resultant blend, when hardened, is too brittle, while at higher percentages, the composition becomes very soft even after subjection to the second step of our novel process.

The resultant polymer-hexamethoxymethyl melamine blends, as mentioned above, according to our novel process, are then subjected to treatment with acid fumes or vapors. The contact of the blended composition with the acid is preferably conducted at room temperature. However, temperatures ranging from about 0° C. to about 300° C., preferably 0° C. to 150° C., may be used. Atmospheric pressure is also preferred but superatmospheric or subatmospheric pressures may be utilized, if desired or necessary e.g. because of equipment limitations.

The blended compositions are contacted with the acid vapors for a length of time sufficient to harden them. Generally, from about 30 minutes to about 48 hours is sufficient to produce a hardened composition which is commercially acceptable.

3

While it is preferable to have the acid material in a gaseous or vaporized state to attain most efficient hardening of the blended composition, the acid material may be used as an atomized or vaporized cloud, or, under some circumstances, even the liquid state may be desirable. Because conditions of use may involve a pressure between zero and superatmospheric and a temperature between absolute zero and, e.g., 150° C., the acid material may be a solid or liquid under normal conditions but a gas under conditions of use.

Generally any acid, capable of bringing about the acid medium necessary for the rapid hardening of the blended compositions at temperatures specified hereinabove may be used. That is to say, generally any strong acid, solution of strong acid, or substance capable of forming a strong acid may be utilized in our invention. By the term "strong acid" is meant an acid which has, in aqueous solution, a dissociation constant greater than $2 \times 10^{-4}$. Examples of such acids include acetic acid, bromoacetic acid, chloracetic acid, α-chloropropionic acid, trichloracetic acid, formic acid, certain acid chlorides, hydriodic acid, hydrobromic acid, hydrochloric acid, hydrofluoric acid, sulfur trioxide, nitric acid, nitrous acid, sulfuric acid, sulfurous acid, nitrogenoxychloride sulfuric oxyfluoride and the like.

The amount of acid used, in vapor, gas or liquid form, is not critical since the resinous compositions are contacted with the acid, in any form, until the composition is hard and tough. If a solution is used, concentrations ranging from about 0.25% to about 10%, by weight, based on the weight of the blended resinous composition are generally sufficient.

The blended compositions which are hardened by the acid step of our novel process, may be first modified to contain various inert materials such as dispersants, diluents, plasticizers, binders, pigments, fillers, dyes, stabilizers, lubricants and the like, without detracting from the excellent results achieved by the process as a whole.

The following examples are set forth for purposes of illustration only and are not to be construed as limitations on the present invention except as set forth in the appended claims. All parts and percentages are by weight unless otherwise specified.

Example 1

Poly(vinyl chloride) and hexamethoxymethyl melamine at a 1:1 ratio, by weight, are blended at 300° F. on a 2-roll rubber mill and removed as a 0.030″ thick film. The film is suspended in air at 25° C. in a closed container having concentrated hydrochloric acid solution on the bottom. The film, originally soft and pliable, becomes hard and horny after only about 8 hours.

Example 2

Poly(vinyl chloride) is compounded in a ratio of 100:100 on a high speed, 3-roll mill with hexamethoxymethyl melamine. The resulting blend is knifed 0.012″ thick on muslin and then heated ten minutes at 325° F. The composite is flexible with a hazy, glossy plastic surface. The coated cloth is then suspended in contact with fumes from concentrated hydrochloric acid for 24 hours. The resultant coated cloth has lost its flexibility and is stiff and hard.

Example 3

To 100 parts of poly(vinyl chloride) are added 150 parts of hexamethoxymethyl melamine. The resultant blend is fed into an extruder which is fitted with a die piece shaped to produce pipe. The pipe, a homogeneous blend of the two polymers, is exposed to hydrochloric acid fumes for 24 hours. The product is a rigid pipe (Barcol hardness of 15) capable of withstanding 212° F. with minimum softening.

Following the procedure of Example 2, various polymers, in suitable solvents, were blended with hexamethoxymethyl melamine in various amounts, then deposited on multi-layered, cotton cloth to form a thick continuous film. The films were then thoroughly dried to free them from solvent. The films were then exposed to acid vapors for 24 hours at 25° C. Every acid treated film hardened and the hardened films were considerably superior to untreated films in respect to their resistance to methyl alcohol and to xylene. The results are set forth hereinbelow in Table I.

TABLE I

| | Percent By Weight (Total Solids) | | | | | | | | |
|---|---|---|---|---|---|---|---|---|---|
| HMMM | 25* | 55 | 150 | 25 | 67** | 145 | 25 | 74 | 150*** |
| Resin | 100¹ | 100¹ | 100¹ | 100² | 100² | 100² | 100³ | 100³ | 100³ |
| Tack Condition | L / PD | S / PD | S / G | None P | L | L / No Change | B / No Change | S | S |
| 2 hr in water | | | | | | | | | |
| 2 hr in xylene | St | St | PL | R | P | No Change | | | |

Code for Table I

HMMM = Hexamethoxymethyl Melamine.
¹ A commercially available resin of butyl acrylate/acrylic acid, (85/15), copolymer dissolved in water as an ammonium salt.
² A commercially available polyester resin containing the reaction products of phthalic anhydride, fatty acid, dimer acid, propylene glycol, ethylene glycol and trimethylolmethane.
³ Terpolymer of styrene/butyl methacrylate/methacrylic acid (55/25/20) in xylene/butanol (50/50) solvent.
L = Leathery; S = Stiff; P = Plastic; B = Brittle; PD = Powdery; G = Grainy; St = Soft; PL = Pliable; R = Rubbery.
\* Contacted with nitric acid fumes.
\*\* Contacted with acetic acid fumes.
\*\*\* Contacted with sulfuric acid fumes.

We claim:

A process for the production of heat and solvent resistant compositions which comprises blending poly(vinyl chloride) with from about 25% to about 150%, by weight, based on the weight of poly(vinyl chloride), of hexamethoxymethyl melamine, and then hardening the blended composition by exposing it to a strong acid.

References Cited by the Examiner

UNITED STATES PATENTS

| 2,624,682 | 1/53 | Hazeltine | 260—67.6 |
| 2,906,724 | 9/59 | Daniel | 260—856 |
| 2,919,206 | 12/59 | Malmquist | 260—853 |
| 2,998,411 | 8/61 | Housekeeper | 260—67.6 |
| 3,107,227 | 10/63 | Suen et al. | 260—853 |

MURRAY TILLMAN, *Primary Examiner.*